Jan. 1, 1957  E. M. BORG  2,776,213
METHOD FOR CANNING EVAPORATED AND FRESH MILK
Filed Feb. 23, 1951  5 Sheets-Sheet 3
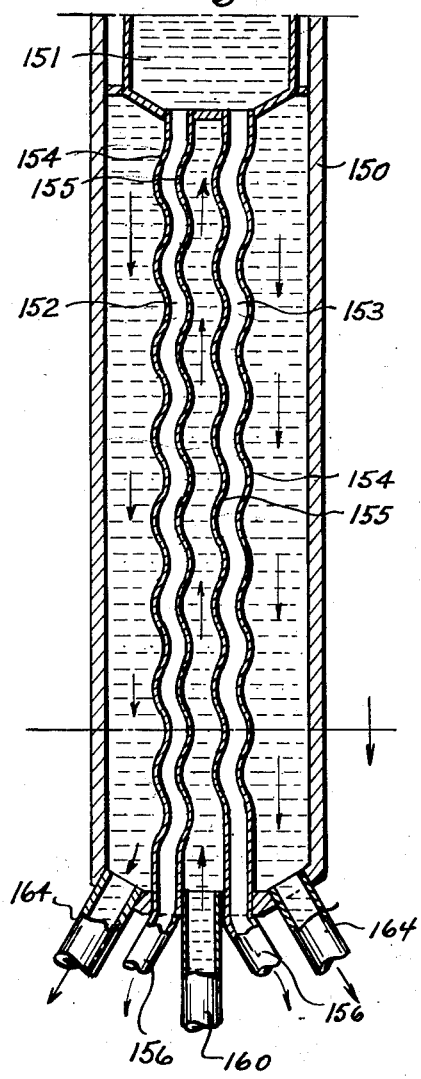
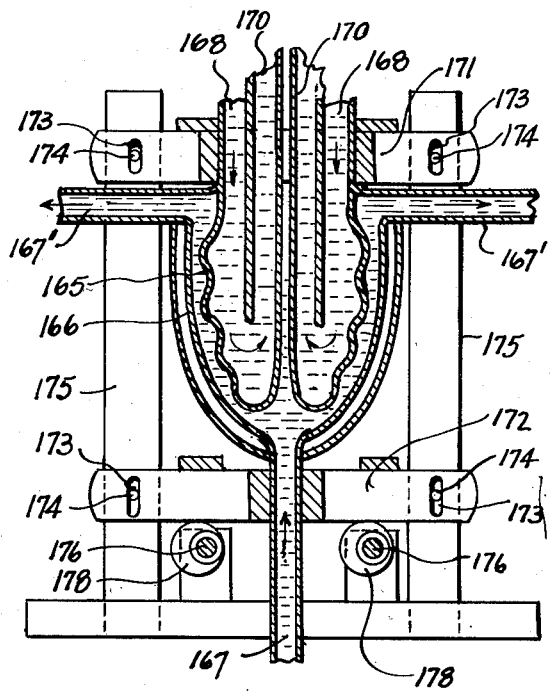
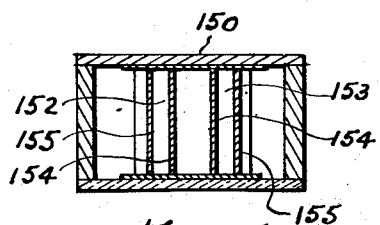
Inventor
EDWARD M. BORG
By
Cook & Robinson
Attorney

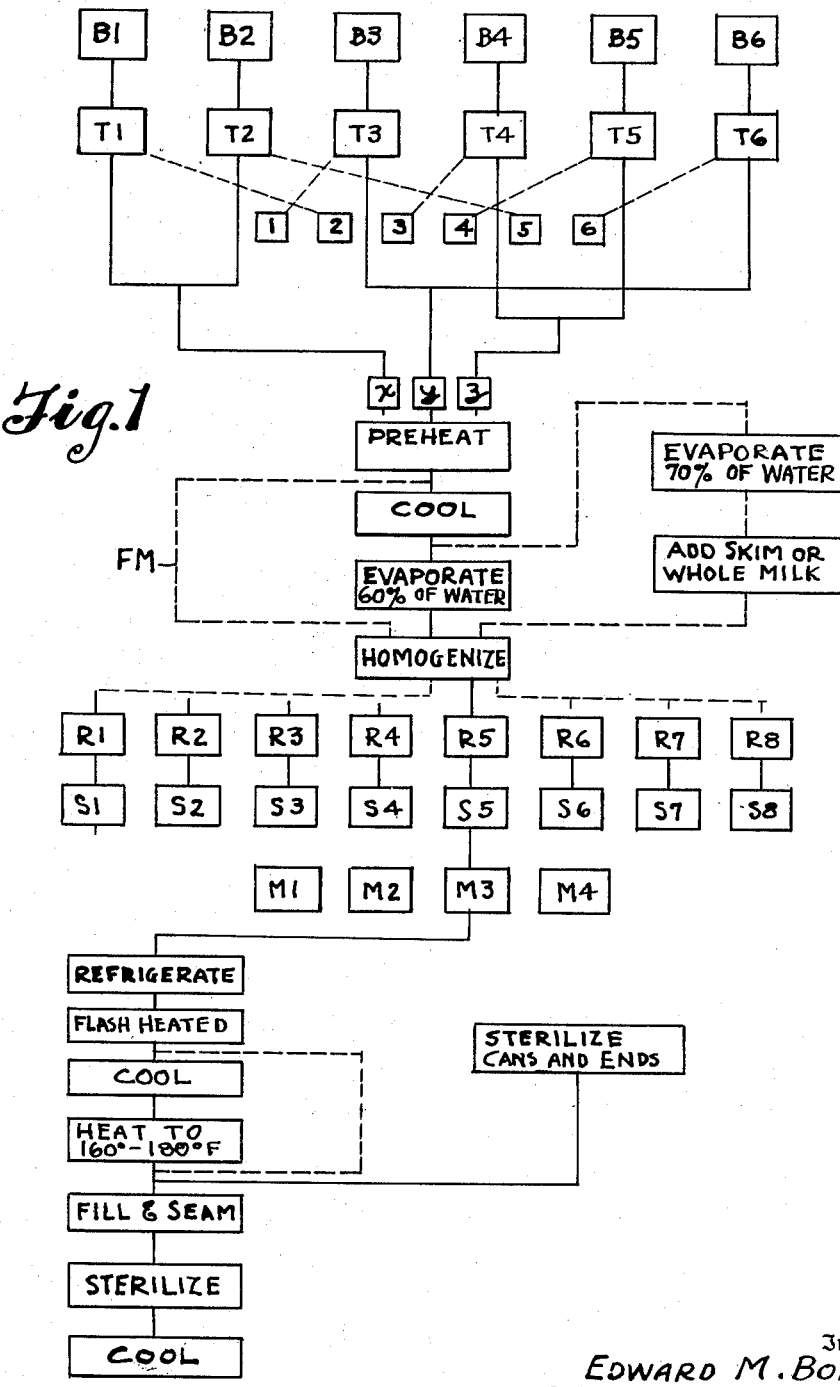

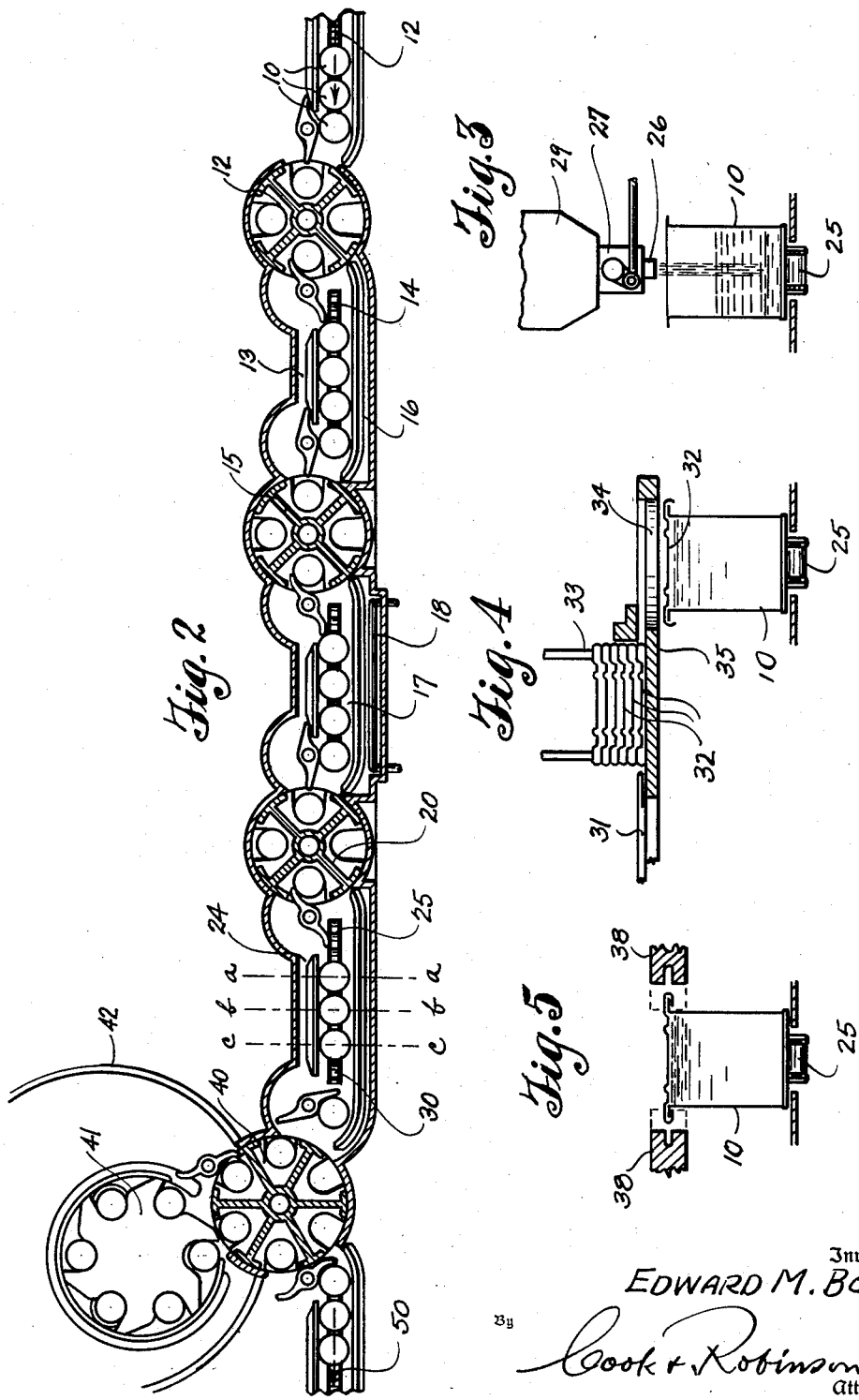

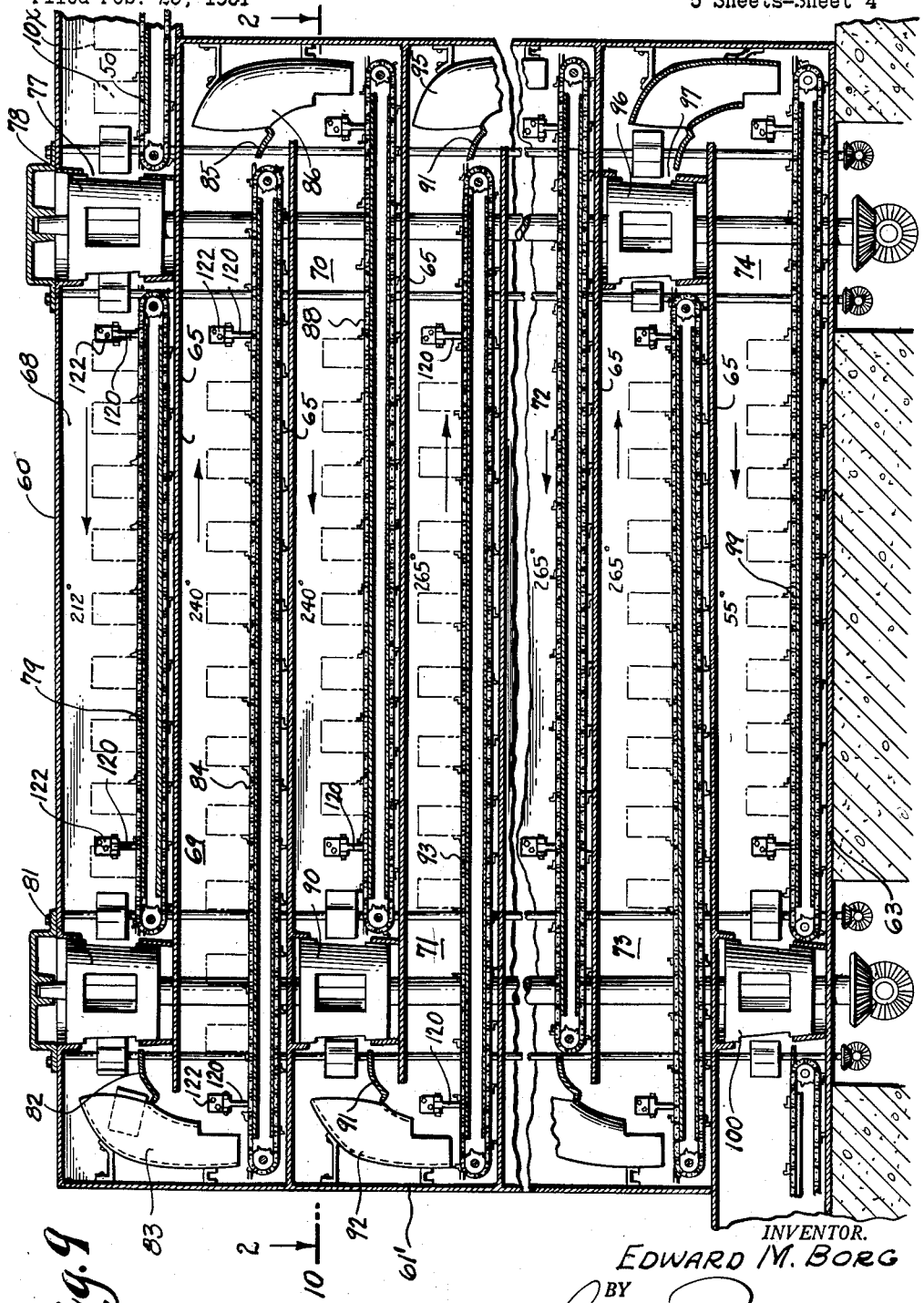

Jan. 1, 1957  E. M. BORG  2,776,213
METHOD FOR CANNING EVAPORATED AND FRESH MILK
Filed Feb. 23, 1951  5 Sheets-Sheet 5
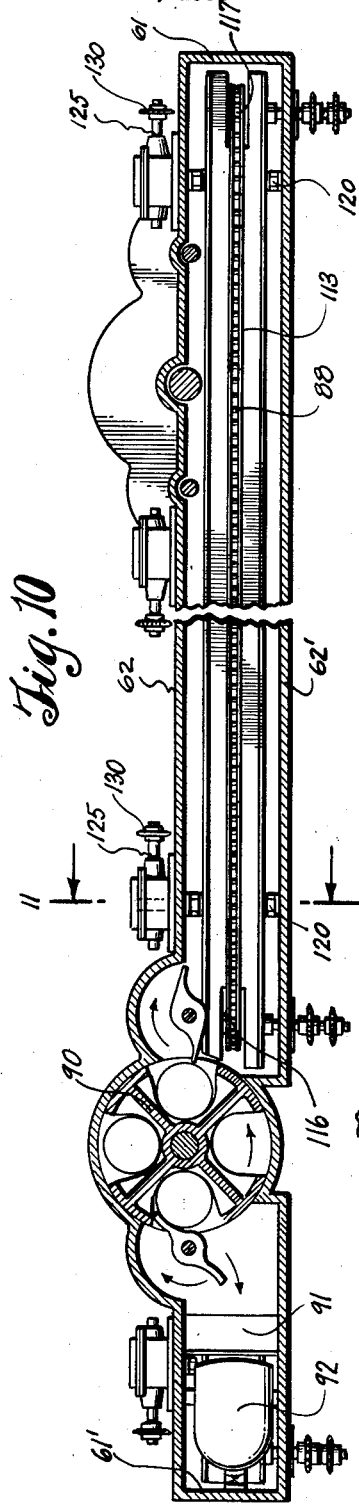
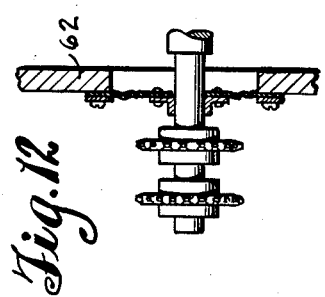
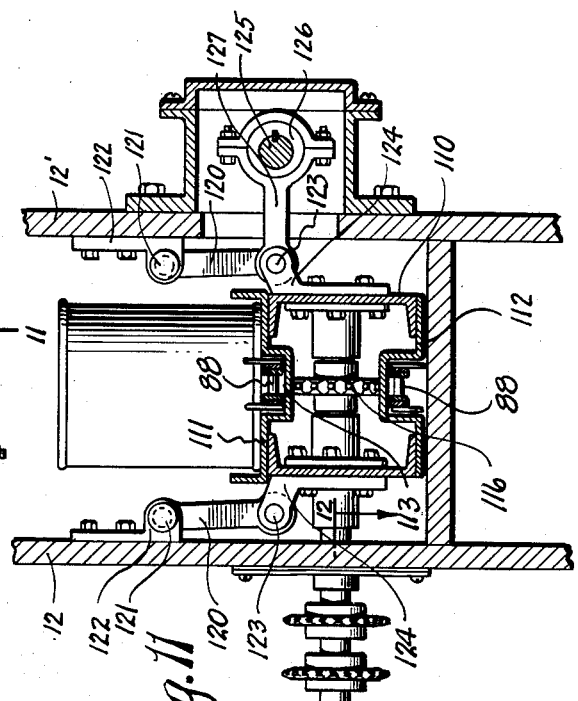
INVENTOR.
EDWARD M. BORG
BY
Cook + Robinson
ATTORNEYS

United States Patent Office 2,776,213
Patented Jan. 1, 1957

2,776,213

METHOD FOR CANNING EVAPORATED AND FRESH MILK

Edward M. Borg, Seattle, Wash.

Application February 23, 1951, Serial No. 212,460

1 Claim. (Cl. 99—54)

This invention relates to improvements in method of and means for the canning of evaporated and fresh milk.

The commonly used, present day method for the processing or production of canned, evaporated milk is substantially in accordance with the following: The batches of fresh raw milk, upon being received at the processing plant, are examined for dirt, bacteria, butter fat, flavor and odor; and usually are tested to determine the heat stability of the individual batches.

Batches of milk that are found to be of satisfactory character, or quality, are preheated under careful control, to from 200° F. to 212° F., by the injection of live steam thereinto, or by passing the milk through heated coils or other forms of tubular systems. From the preheater the milk is drawn into vacuum pans, or is passed into apparatus of condenser form, and about 60% of its contained water is removed by heating to about 130° F. while under vacuum of from 25 to 26 inches.

The concentrated milk is then pumped through a homogenizer to prevent the rising of cream in the evaporated product. Then the homogenized milk is cooled and may be held under refrigeration until a number of batches have been prepared for standardization by the blending of batches to give a desired or required composition.

The standardized milk is then run into plain tin cans of the vent hole type, and the holes sealed with solder. The milk, as thus sealed in the cans, is then sterilized by an application of heat sufficient to destroy bacterial spores and to give the milk the desired viscosity, but not to produce a casein curd.

The sterilizing process is usually carried on in a continuous sterilizer for about seventeen minutes at a temperature of about 240° F. During the sterilizing operation the cans of milk are usually caused to be slowly rolled or turned to insure a more uniform distribution of heat thereto. When sterilization has been completed, the cans are cooled and stored until time of distribution for use.

One of the undesirable results of present day methods of the heat sterilization of canned milk is the caramelization and scorching of the milk. Caramelization and/or scorching are not only detrimental to the taste and flavor of the product, but also cause a brownish discoloration that is objectionable. Various reasons for caramelization and/or scorching have been advanced, but both objectionable effects can be considered to be due, in most part, to overheating of certain constituents of the milk, prior to or to a certain degree after the milk has been sealed in the cans.

In view of the undesirable effects of caramelization and scorching resulting from the present day method of applying heat in the preparation and sterilizing of canned milk, it has been one of the principal objects of this invention, to provide a novel method of heat treating, standardizing and sterilizing that avoids discoloring, caramelizing, scorching and all other undesirable effects from the application of heat either for evaporation or sterilization, and insures a tastier, cream colored and more marketable product.

It will further be stated that present day processes do not to my knowledge provide any simple and satisfactory means for visually testing the fresh milk to ascertain its desirability or undesirability for use before being subjected to any treatment. Nor do they provide any simple and satisfactory means whereby, at any point along the processing line, the milk can be readily tested to determine whether or not scorching or caramelization has taken place.

In view of the lack of any simple means for the visual testing of milk, it has been a further object of this invention to provide such means, characterized by the use of a light beam of a specific wave length to disclose, by reference to the color change of the milk under this light beam, whether or not it is of a desired quality for use and also to what extent, if any, caramelization or scorching has occurred therein by reason of heating during sterilization or other treatments to which it has been subjected either before or after the sterilizing treatment.

It is also an object of this invention to provide new and novel apparatus for use in the heating, cooling, canning and sterilizing of milk.

In the treating and canning of condensed or uncondensed milk according to the present process and by the means herein provided, the batches of fresh raw milk, as received at the processing plant, are first given the usual tests for acidity, bacteria, butter fat, odor, etc. Then the accepted batches are individually visually tested, as hereinafter explained and usually, after several batches have been received and tested, they are mixed or blended as may be required to give uniformity of product.

The present visual testing of milk is based upon the discovery that both fresh and treated milk is photo-sensitive to a light beam of a specific wave length, and the degree of its desirability for use can be measured by reference to its color under this particular light beam. For example, under the rays of light of that certain wave length which I have discovered to be satisfactory, milk that is highly desirable for use has a very definite bright yellow color from which the color of milk of less desirability varies toward a lighter shade to more or less extent according to its variance from the desired quality. Thus, it is possible, under a light beam of a specified wave length, to spectroscopically test the quality of batches of milk as they arrive at the plant and then, by a proper blending or mixing of batches to obtain more uniformity in quality and a better "standardization" of the canned product. Furthermore, and as a principal feature of this invention, it has been possible by use of the selected light beam, to detect caramelization of milk occurring at any point along the treating line, both before and after its being subjected to sterilizing heat, as will later be explained.

Caramelization alone is believed to be the result of overheating the lactose constituent of the milk. Overheating of other solids results in scorching. Both of these undesirable effects, when resulting from the sterilizing of the milk in the sealed cans, are believed to be due to the fact that the heat as applied to the metal cans is not caused to be conducted into the body of milk with sufficient rapidity to avoid overheating the thin film of milk that adheres to and is in direct contact with the can wall surfaces. It is a present day practice to rotate the cans as heat is applied thereto for sterilization, but rolling of cans apparently does not cause a molecular action in the milk that is fast enough to avoid the excessive heating of the milk film that remains in direct contact with the can walls.

The present method or process of sterilization that avoids burning, overheating and caramelizing provides that the sealed cans be subjected to intermittent and alternate periods of rapid vibration and rest during the period of their being subjected to sterilizing heat and also while being cooled after sterilization. The present method further anticipates that the cans be progressively advanced through passages or tunnels in the heating chamber of the sterilizer that are successively increased in temperature ranging from 212° F. to about 265° F., or higher as needed, and are then moved through a final tunnel of about 55° F. or lower for quick cooling. The cans of milk are advanced through the tunnels on conveyor belts, and when discharged from one tunnel to the next, are caused to be inverted to insure the maximum uniformity of heat treatment.

The present operation contemplates that the alternate periods of vibration and rest shall each be about three to four seconds duration, but might be more or less, and that vibration of the cans be effected by mechanically vibrating the can conveyors as presently explained.

The effects of the intermittent periods of vibration and rest on the milk in the cans can be shown to be entirely different from results thereon that are obtained by the present day practice of rolling or turning the cans in the sterilizer. It can be shown that the mere rolling or turning of the cans does not cause any perceptible change in position or any intermixing of the portions of milk of different temperatures as contained in the can. Therefore, the film of milk that is next adjacent the can wall surfaces and which tends to adhere thereto will become excessively heated and the caramelization of lactose and scorching of solids in this film portion is a natural result. The present method, characterized by the alternate periods of vibration and rest to which the cans of milk are subjected in the sterilizer, results in release of the film from wall surfaces and the inter-mixing of portions of milk of lesser temperatures with those of higher temperatures in all parts of the can so quickly and so effectively that overheating is avoided.

The present process is carried out as follows: As the batches of milk are received at the processing plant, each is first given the usual tests for acid, odor, bacteria, butter fat and flavor. Unsatisfactory milk is passed on for other uses. After a number of batches have been tested and found satisfactory, samples of the individual batches are taken and these samples are then individually subjected to the present light test.

The lamp which is now being used to provide a light beam for this visual test is a mercury lamp, using a "black light" radiation through use of a red-purple filter. Under the rays of black light transmitted by this lamp, fresh milk of test quality that has not been subjected to any caramelization or scorching will have a bright yellow fluorescence, whereas, if caramelization or scorching has taken place therein to more or less extent, the milk will have a whitish fluorescence, varying from grayish white to chalk white in accordance with the extent of scorching and/or caramelization. Thus, if a tested milk fluoresces bright yellow under the light ray test, it is generally considered as being of most suitable quality for canning. Milk that fluoresces pale yellow, or is cream colored, may be considered satisfactory for use but to lesser extent. This condition can be improved by blending as later explained.

The various samples, after being subjected to the light beam test, are then labeled and placed in order with respect to the extent of their paleness from the bright yellow color which indicates milk of most satisfactory quality. In accordance with the grading of the separate batches of milk, as established by the color tests of the samples taken therefrom, the batches are mixed or blended to obtain maximum uniformity of product. For example, assume that samples from six batches of milk have been subjected to the light beam test, and the tests thereof have shown the samples to vary to different amounts from the desired bright yellow toward pale yellow. The batch that is represented by the sample that under test is the nearest to the desired bright yellow color is mixed with a batch represented by the sample that under the test is furtherest from the desired color. Likewise, the batches represented by the samples that are next to the best and next to the furtherest from satisfactory color are mixed together. Then the two intermediate batches are mixed together. Thus, providing three new batches that will be substantially alike in value in so far as color and quality is concerned. These "standardized" batches are then separately processed, each as follows:

The milk of the standardized batch is now given the usual present day pre-heating treatment under careful control to raise it to a temperature of from 200° F. to 212° F. and is then quickly cooled to prevent cooking. The preheated milk may, if desired, be again subjected to test under the light beam to ascertain whether or not the milk has been detrimentally affected in preheating, such being disclosed if the milk has a whitish color instead of a creamy or yellow tinge. If it passes the test, the cooled milk is then drawn into vacuum pans, or into present day types of condensers, and about 60% of its contained water is evaporated therefrom. The evaporated milk may then be adjusted by correctives, as prescribed by the Pure Food and Drug regulations of the Government, and then homogenized in the usual way. As the batches of homogenized milk successively come through the homogenizer, they are held under refrigeration for further standardization. However, prior to standardization of condensed, homogenized batches, tests and adjustments may be made in the usual manner to meet Federal specifications.

Further standardization requires the taking of samples from the batches and subjecting the samples to the light beam test preparatory to standardizing under the present color specification. This standardization contemplates the mixing of batches of milk of most satisfactory color with batches of least satisfactory color so as to arrive at an average, or uniformity of color for all batches.

The batches of evaporated milk after being thus standardized in respect to color and quality are held under refrigeration until ready for canning. Then, as required, are preheated to from 160° F. to 180° F. and the milk run into sterile cans and the cans sealed. For the best results, sterilized, lacquer lined cans, to counteract tin flavor, and dark in color to avoid bleaching the contents, should be used.

The present method contemplates use of open end cans which, after filling, are closed by the double seaming of ends thereon. The sterilizing of the cans and covers preparatory to filling the cans contemplates the advancing of the cans through chambers wherein they are subjected to sterilizing heat, then cooled and filled while in sterile condition. The filled and sealed cans are advanced directly to the sterilizer, passing through chambers of progressively increased temperatures that start at about 212° F. and increase to as high as 290° F. if needed, the treatment requiring about ten minutes, more or less. From the sterilizing heat the cans are passed directly into and through a quick cooling zone at about 55° F., in about one minute to prevent cooking of milk in the cans.

The present milk sterilizing treatment is characterized by the subjection of the sealed cans of milk while being heated and while cooling to alternate periods of vibration and rest. At the present time, these periods each are of about three to four seconds duration, but may be more or less extended. The periods of rest of the cans are for the purpose of permitting the milk immediately adjacent the can walls to become heated to the necessary sterilizing degree. The vibrating action imparted to the cans after each period of heating is to cause the highly heated milk that is immediately adjacent the can walls to be dissipated into the body of milk. The periods of vibration and rest also are continued through the cooling period as it expedites the necessary quick cooling operation to prevent cooking.

Means for practicing the present method have been illustrated in the accompanying drawings, wherein:

Fig. 1 is a flow chart of the present method of processing and canning evaporated or fresh milk.

Fig. 2 is a horizontal sectional view of apparatus for the sterilizing of empty cans, filling, and sealing the cans, preparatory to sterilizing the milk in the cans.

Fig. 3 is a cross-sectional detail of the apparatus, taken on the line a—a, in Fig. 2, illustrating the can filling operation.

Fig. 4 is a cross-sectional detail, taken at the line b—b in Fig. 2 showing the can cover applying operation.

Fig. 5 is a cross-sectional detail, at the line c—c in Fig. 3, showing the cover clinching operation.

Fig. 6 is a vertical section of an apparatus that may be used for milk pre-heating or for cooling.

Fig. 7 is a horizontal section, taken on line 7—7 in Fig. 6.

Fig. 8 is a vertical section of another form of apparatus for the heating or cooling of milk.

Fig. 9 is a vertical, longitudinal sectional view of a machine designed for the sterilizing of the canned milk in accordance with this invention.

Fig. 10 is a horizontal section taken on line 10—10 in Fig. 9, showing the can conveyor, and valve mechanism as used therein.

Fig. 11 is an enlarged cross-sectional view, on line 11—11 in Fig. 10, showing means for vibrating the can conveyor.

Fig. 12 is a sectional detail on line 12—12 in Fig. 11.

Referring more in detail to the drawings and first giving consideration to Fig. 1: In this flow chart, six batches of milk as brought to the processing plant are designated by the rectangles designated by B1, B2, B3, B4, B5 and B6. These batches, after being tested for acid, odor, butter fat, bacteria, dirt, flavor, etc., and assuming that each is found satisfactory for use, are designated, respectively by the rectangles labeled T1, T2, T3, T4, T5 and T6.

The individual samples that have been taken from the six tested and approved batches, for the present color test, are designated by the small squares labeled 1, 2, 3, 4, 5, and 6, and for explanatory purposes, it has been indicated by their dotted line connections with the various tested batches, T1, T2, etc., the particular batch from which each sample was taken. The samples, designated by numerals 1 to 6 inclusive, are here shown arranged in order with respect to color quality, that is, sample 1 is the one which, under the previously explained color test, was the most satisfactory with reference to the bright yellow color of the best milk, while the others are in order of the extent of paleness from the bright yellow toward a lighter color.

From the color tests made, it is shown that batches T3 and T6 represent the two color extremes; batches T1 and T2 are the next to the extremes, and batches T4 and T5 are the two remaining. Thus, to get three batches of approximately the same color, batches T3 and T6 are mixed together; batches T1 and T2 are mixed together and batches T4 and T5 are mixed together. The three batches, resulting from such mixing, are here designated at x, y and z.

Batches x, y and z are then individually passed through a suitable preheater and subjected to from 200° F. to 212° F. The pre-heated milk is then cooled and held in refrigeration until ready for evaporation.

Evaporation is usually effected by subjecting the milk to heat while held in vacuum pans or other apparatus of condenser form. Evaporation is carried on until 60% of water has been removed. The condensed product is then homogenized, in the usual manner. Successive batches, corresponding to the batches x, y, and z, are then retained in storage. In Fig. 1, eight batches have been designated by the reference characters R1, R2, R3, etc.

Each of these prepared batches, R1 to R8, or whatever number there may be, are then standardized to Government Specifications. Batches thus standardized are here designated by reference characters S1 to S8. These batches are then blended or mixed as may be required to obtain batches representing the average product, as designated by the rectangles M1, M2, M3 and M4. Each of these batches is then held under refrigeration until ready to be carried through to final treatment, as presently explained.

The present invention anticipates that, as an alternative practice, indicated in the flow diagram, a batch of milk that has been cooled, after the first pre-heating operation, can be evaporated to remove 70% or more of its water, and then restored to a 60% water condition by addition thereto of skim milk or whole milk. This has the advantage of returning to the milk some of the lost color, and incidentally restores any loss of flavor.

It is also anticipated that fresh milk may be canned according to the present process, and in such event the preheated batches of milk would by-pass the evaporator and be delivered to the homogenizer. This by-passing is indicated in the dotted line FM in Fig. 1. The further treatment of fresh milk is the same as given the evaporated milk.

The final treatment of all mixed batches, such as M1, M2, M3 and M4, is alike. Each refrigerated batch is first subjected to a flash heating treatment of high degree to kill spores, spore bearing bacteria, and all bacteria in general. Then it is cooled and held in sterile containers until ready to be run into cans, or after being quickly cooled down to proper temperature, of around 160° F. to 180° F., can be run into the sterile cans, sealed and sterilized as the final step.

In the event that the milk is held in cooled condition, after the flash heating operation, it must be heated prior to the can filling operation up to about 160° F. to 180° F.

Afer the empty cans have been sterilized, cooled to filling temperature, filled and sealed in a sterile atmosphere, the milk is sterilized in the sealed can by the means shown in Figs. 9, 10 and 11, presently to be described.

First describing the method of a means for sterilizing the empty cans, prior to filling and sealing them:

In Fig. 2, a line of equipment has been shown wherein 10 designates uncovered cans as delivered in succession on a traveling conveyor 11 to a rotary valve 12 whereby they are delivered into a steam tight sterilizing chamber 13. The cans are advanced along chamber 13 by a conveyor 14 to a rotary discharge valve 15. Valves 12 and 15 close the opposite ends of chamber 13. This chamber is here indicated as being heated to a satisfactory sterilizing temperature by steam coils 16 or by any other suitable means, and the cans become sterilized merely by being passed through the heated chamber.

From the valve 15, the sterilized cans are discharged into a cooling chamber 17; it being understood that cooling of each can is necessary in order to avoid scorching the milk when it is delivered thereinto. The chamber 17 is indicated as being cooled by refrigerated coils shown at 18. The chambers 13 and 17 may be lengthened as may be required to give ample sterilizing and cooling time. It is also desired that the chamber 17 be equipped with heating coils or other means to make possible the sterilizing of this chamber by heat prior to use of the machine.

From the chamber 17, the cans are delivered by a rotary valve 20 into a sealed, sterile chamber 24 for filling, covering and cover clinching, preparatory to double seaming the covers to the cans. As the cans enter the chamber 24, they are delivered on to a conveyor 25 and are advanced therein beneath the discharge spout 26 of a filler valve 27 applied to the base of a milk container 29 as indicated in Fig. 10. It is understood that this filler may be of the multiple head type for high capacity or high speed operations.

The valve 27 is mechanically actuated in proper timing with the can movement to discharge a predetermined measured amount of milk into each can. If the filler is of the multiple type, and rotates while filling, the cans can travel with the filler valve.

As each can is filled, it is advanced by a conveyor belt 25 to a point where a sterile cover is dropped into its open end. In Fig. 3 there has been indicated a conventional type of cover feed mechanism comprising a reciprocally movable slide 31 which advances can covers 32 from the lower end of a stack guide 33 to a discharge opening 34 in a plate 35. Overlying the path of travel of the filled cans, the delivery of the covers is so timed as to insure them being received properly on the cans as has been illustrated in Fig. 4.

After a cover has been dropped into place on a can, the can advances to a cover clinching means as at 38—38 in Fig. 5 which operates to spot clinch the cover at opposite sides. Then the can is advanced by a rotary valve 40 to a seamer for the double seaming of the cover to the can. The seamer is here indicated at 41 and is shown to be enclosed in a chamber 42 which may be for sterilizing purposes or for sealing in vacuum.

From the seamer, the sealed cans are advanced by the rotary valve 40 to an off-bearing conveyor 50. From this the filled and sealed cans are delivered to the sterilizer.

It is to be understood that this entire equipment is equipped with means for the heat sterilizing it and for maintaining it in sterile conditions at all times.

A preferred form of sterilizing apparatus is shown in Fig. 9. It comprises an elongated retort or housing, of closed construction, having a top wall 60, opposite end walls 61—61', opposite side walls 62—62' and bottom 63. This housing is divided interiorly into a succession of elongated passages or tunnels, by a plurality of vertically spaced horizontal partition walls 65. These walls provide, between them, a succession of passages or tunnels, each to receive the cans thereinto at one end and to discharge the cans therefrom at the other end for delivery to the next lower passage.

The cans of milk to be sterilized enter the housing 60 directly into the uppermost tunnel 68 at one end thereof, and are conveyed in succession therealong to the opposite end of the tunnel and there discharged to the corresponding end of the next lower tunnel 69. Cans received in tunnel 69 at one end thereof are likewise conveyed to the opposite end of the tunnel for discharge to the next lower tunnel 70. In like manner, the cans progress through the remaining channels 71—72—73 and 74 of the retort; the tunnels 68 to 73 being successively increased in temperature, and the final tunnel 74 being maintained at a relatively low temperature of 55° F. or lower for cooling purposes.

In Fig. 9 the sealed cans of milk, designated at 10X, are shown as being moved by the belt conveyor 50 through an opening 77 in the end wall 61 of the retort and advanced to a rotating gate valve 78, that seals that end of the upper tunnel 68. By means of this valve and associated mechanisms of well known kind, the cans are advanced into the tunnel 68 onto an endless conveyor belt 79, and carried thereon to the opposite end of the tunnel and are there successively discharged by means of a rotating gate valve 81, which closes that end of the tunnel.

The cans 10X are discharged from the valve 81 onto a slide 82 whereby they are caused to be inverted and dropped into a guide chute 83 whereby they are delivered onto an endless conveyor belt 84 operating in the tunnel 69, for conveyance of the cans to the opposite end of that tunnel, there to be discharged from the conveyor onto an inverting plate 85 and into a chute 86 which delivers them in an inverted position onto an endless conveyor belt 88 contained in a tunnel 70. Conveyor 88 carries the cans to the opposite end of the tunnel where they are discharged by a rotating gate valve 90 onto an inverting slide 91 and into a guide chute 92 and thereby delivered onto a continuous belt conveyor 93 in the tunnel 71, to be carried on that conveyor to the opposite end of the tunnel for discharge onto an inverting plate 94 and chute 95 for back and forth delivery in successive channels as above described, and finally discharged by a rotating gate valve 96 through a passage 97 into a chute 98 to the cooling tunnel 74. The cans are received on a traveling conveyor 99 and delivered to a rotary valve 100 for discharge from the chamber. The milk is then ready for distribution.

The main feature of the present sterilizing treatment is the alternate periods of vibration and rest of the cans while being subjected to the sterilizing heat and while being cooled. The means which I have provided for vibrating the cans is shown best in Figs. 10 and 11, and it comprises mechanical means whereby the conveyors on which the cans are moved, are alternately vibrated and then held at rest. Since all conveyors are substantially alike in construction, the disclosure in Figs. 10 and 11 will be described with the understanding that it will apply equally to all.

The conveyor chain belt, there designated by numeral 88, is shown to be carried by an elongated, horizontally directed frame structure of box-beam form comprising opposite sides 110—110, a top 111 and a bottom 112. The top run of the conveyor chain travels in a guide groove 113 in the top wall. The chain belt passes about sprocket wheels 116 and 117 at opposite ends of the frame, by means of which it is driven. The frame structure is freely suspended at its opposite ends from the opposite side walls of the housing by hanger links 120 as shown best in Fig. 11, that have upper ends pivotally attached as at 121 to brackets 122 fixed to the walls, and lower ends pivotally attached as at 123 to brackets 124 on the frame.

Mounted at one side of the frame, at its opposite ends, and at intermediate points if necessary, are shafts 125 equipped with an eccentrics 126. Connecting rods 127 are applied about the eccentrics and attached to the conveyor frames, as in Fig. 11. Rotation of the shafts results in laterally reciprocating the conveyor supporting frame. The driving of the shafts 125 is effected through the mediacy of sprocket wheels 130 at their ends, by any suitable means. The vibrating action should be through a lateral movement of about one-half inch, or more, and about three to four times per second.

The means for driving the various conveyors, valves, etc. may be according to standard practice, or as may be required to properly carry on the operation.

The equipment shown in Figs. 6 and 7 is designed for the quick heating of milk as used in the process. In these views 150 designates a vertical enclosing housing. At the top end is a milk receptacle 151 and leading downwardly therefrom are two passages 152 and 153, each defined between two rather closely spaced stainless steel plates 154—155. The passages discharge to conductors or pipes 156 that lead to a receptacle for the heated milk.

The plates which define the passages are of corrugated form, thus to cause the milk as it flows downwardly to be forced into intimate contact with the plates and to be continuously vibrated.

Hot water is supplied to the lower end of the housing through a pipe 160, and flows upwardly between the passages 152 and 153 and downwardly along their outer sides to discharge pipes 164. The central and side passages are connected at the upper end of the housing.

In Fig. 8 I have illustrated an alternative form of heater comprising a housing 165 surrounded by a water jacket 166, supplied at the lower end with hot water through a pipe 167 and having discharge pipes 167' leading from its opposite sides. The hot water jacket is enclosed in a chamber for vacuum or insulation.

Milk enters the housing 165 at its upper end through pipes 168, flows downwardly, then is forced upwardly through outlets 170, as indicated by the arrows. As a feature of this device, the outer walls of the housing 165 are corrugated, and the housing is rigidly supported at upper and lower ends in a frame structure comprising upper and lower horizontal bars 171 and 172. These bars are formed at their ends with vertical slots 173 and pins 174 fixed in a rigid frame 175 are extended through these slots. A pair of horizontal, revolubly driven shafts 176—176 are mounted below the bar 173 and cams 178 on the shafts engage the bar to cause the supporting structure for the housing to be vertically vibrated thus to keep the milk in such motion that no scorching due to contact with the water heated walls is apt to occur.

It is not applicant's intention, by reason of describing the various devices represented in Figs. 2 to 12 of the drawings, to in any way limit the invention to use by means of these devices; it being understood that in so far as the pre-heating, cooling, evaporating and homogenizing is concerned, these steps can be carried on by present day apparatus, if necessary or desired.

The success of the present method as hereinafter claimed is thought to reside primarily in the use of the color test, both for detecting caramelization or overheating, and for color standardizing, and in the intermittent vibrating of the cans of milk during the sterilizing and cooling operations.

The color test has proven to be a means of detecting flavor deficiency. The bright yellow color of fresh milk is a designation of good flavor. White designates some burning or caramelization, and absence of a desired flavor. Chalk white discloses excessive caramelization.

By reason of the vibrating of the milk cans while the milk is being sterilized, a higher sterilizing temperature can be safely used.

While it has not been specifically mentioned, it is to be understood that the chamber in which the cans of milk are sterilized is maintained at whatever pressure is required to withstand internal pressures in the cans created by reason of the sterilizing heat.

The foregoing description of apparatus pertains to the use of open end cans which are filled, then covered and double seamed. It is to be understood that the vent hole type of cans may be used if this is desired. Such cans would be filled by means and in a manner now well known in the art, it being required only that the same precautions in respect to maintaining containers and equipment in sterile condition be followed.

Having thus described my invention, what I claim as new therein and desire to secure by Letters-Patent is:

The method of blending milk which has been heat treated to incipient caramelization temperatures comprising exposing samples of said milk taken from a plurality of batches of heat treated milk to a beam of "black light" directed against the surface of each sample, grading the batches as to their fluorescence in the color range from white to bright yellow and corresponding to the maximum to minimum caramelization of the heat treated milk, then mixing those batches of milk of opposite degrees of fluorescence and obtaining a uniform product of optimum flavor characteristics from the said heat treated milk.

References Cited in the file of this patent

UNITED STATES PATENTS

| | | |
|---|---|---|
| 1,273,375 | Jone | July 23, 1918 |
| 1,831,034 | Roeder | Nov. 10, 1931 |
| 2,018,332 | Trebler et al. | Oct. 22, 1935 |
| 2,322,693 | Kennedy | June 22, 1943 |
| 2,388,103 | Whitaker et al. | Oct. 30, 1945 |
| 2,460,101 | McMurray | Jan. 25, 1949 |
| 2,600,221 | Domingo | June 10, 1952 |

OTHER REFERENCES

Pringsheim et al.: Luminescence of Liquids and Solids, published in 1943 by Interscience Publishers, New York City, pages 103, 120, 121 cited.